UNITED STATES PATENT OFFICE.

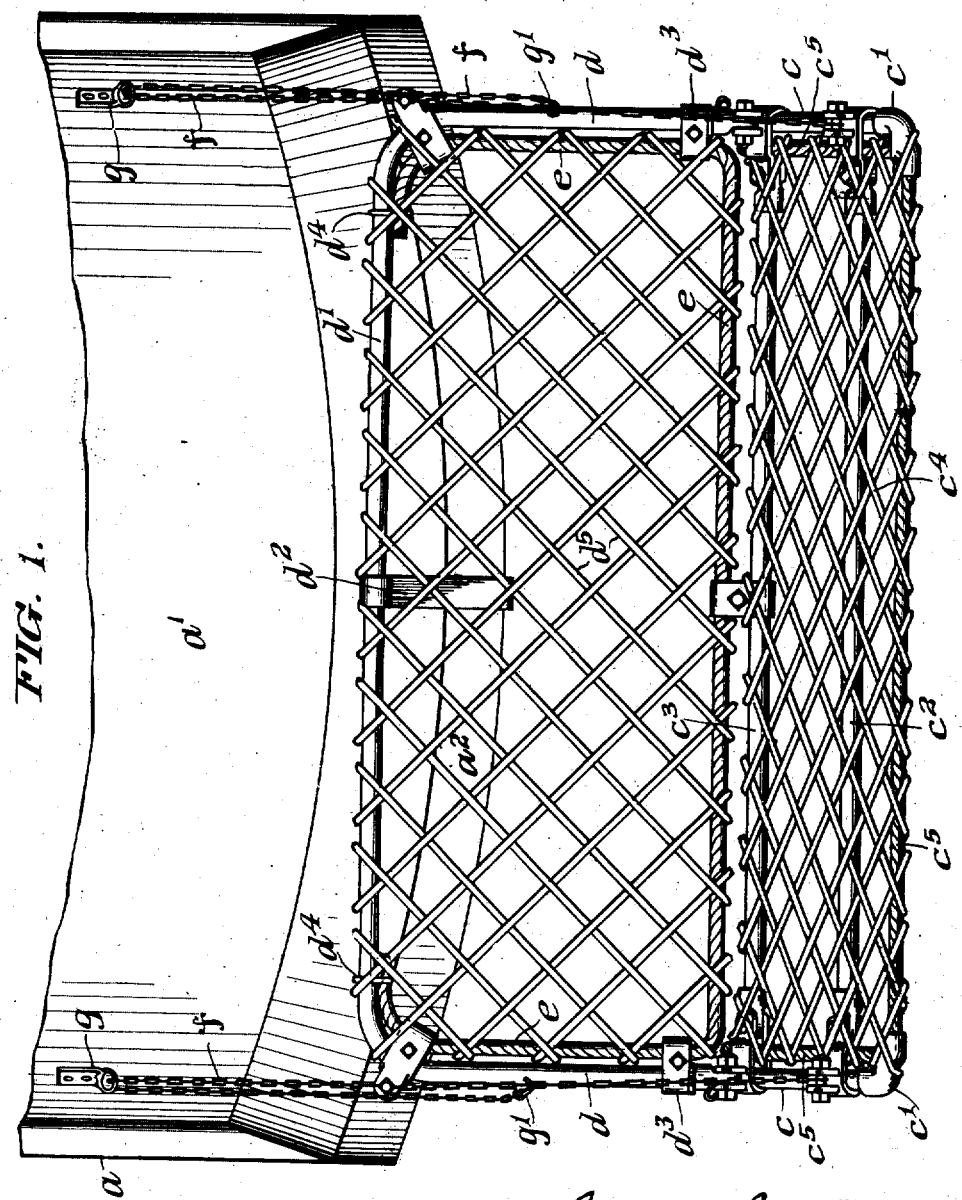

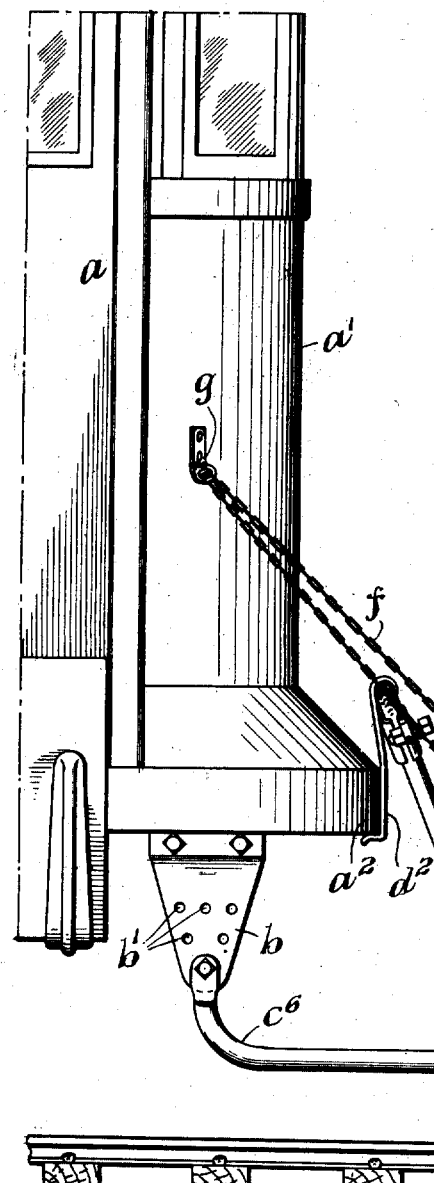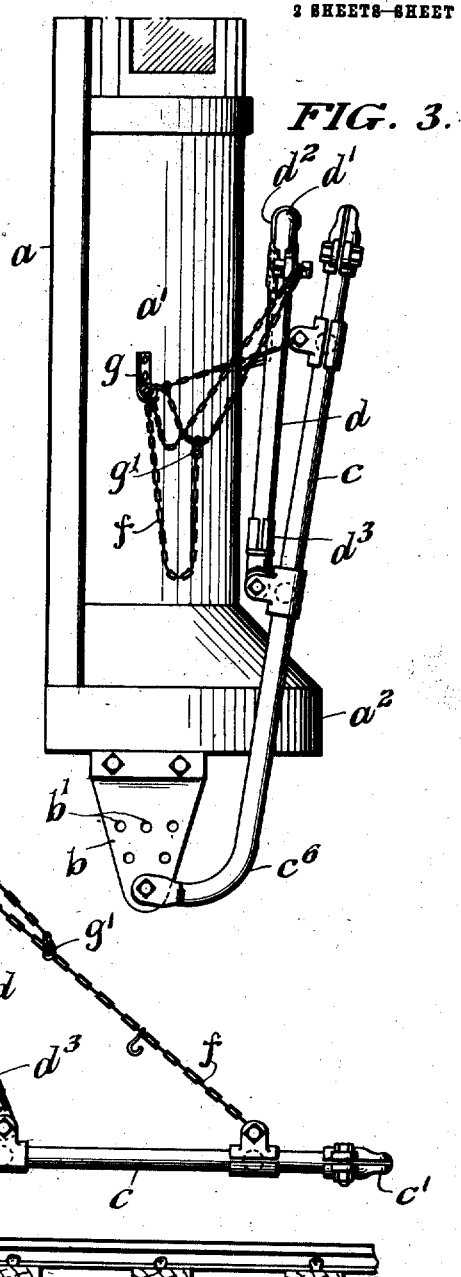

JAMES H. E. BRANSON, WILLIAM H. QUICK, AND THOMAS F. MACKELL, OF PHILADELPHIA, PENNSYLVANIA.

CAR-FENDER.

990,221.  Specification of Letters Patent.  Patented Apr. 25, 1911.

Application filed January 13, 1911. Serial No. 602,413.

*To all whom it may concern:*

Be it known that we, JAMES H. E. BRANSON, WILLIAM H. QUICK, and THOMAS F. MACKELL, all citizens of the United States, residing at the city of Philadelphia, in the county of Philadelphia and State of Pennsylvania, have jointly invented certain new and useful Improvements in Car-Fenders, of which the following is a specification.

Our invention relates to certain improvements in foldable fenders, for trolley cars.

Our invention consists of a fender designed to be used on a car provided with a turtle-back bumper and consisting of an apron and a longitudinal framing, the apron being fulcrumed to the longitudinal framing and having a centrally located clamp movably connected with the upper end portion of the apron and arranged to be movably fitted against and under the bumper of the car to prevent infolding of the fender while the longitudinal framing of the fender is in an extended position.

The nature and scope of our said invention will be more fully understood from the following description taken in connection with the accompanying drawings forming part thereof, in which—

Figure 1, is a front elevational view of a fender embodying main features of our invention in operative position. Fig. 2, is a side elevational view of Fig. 1; and Fig. 3, is a side elevational view of the fender in its raised or folded position.

Referring to the drawings, $a$ is a car having a front dash-board $a^1$, which terminates in what is known as a turtle-back bumper $a^2$. Depending on each side of the car in rear of the bumper is a perforated bracket $b$, to which the side framings of the car fender are pivoted in perforations provided in the bracket. The fender framing $c$, consists of tubular sections united by couplings $c^1$, at the front corners, as clearly shown in Fig. 1.

$c^2$ and $c^3$ are cross-bars connected with the side framing $c$, and with one of which $c^3$, is connected an open mesh-matted rope bed $c^4$ and the other $c^4$, lying underneath and partially supporting the said bed.

Fulcrumed to the framings $c$, is an apron framing $d$, which is provided with an open mesh-matted rope bed $d^5$. The apron is provided with a clamping hook $d^2$, arranged to extend down against the turtle-back bumper $a^2$, and to fit under the same as clearly shown in Figs. 1 and 2.

$d^3$, are a series of clips connected with the framing $d$, and cross-bar $c^3$, and through which a thick rope $e$, is passed. This rope is extended along the lower portion and sides of the framing $d$, and is held clipped at $d^4$, to the upper portion of the said framing $d$, as clearly shown in Fig. 1. Beyond the fulcrumed connection of the framing $c$, with the framing $d$, on each side, the framing $c$, is extended rearwardly and curved upwardly at $c^6$, as shown in Fig. 2. The portion $c^6$, is either bolted or pivoted on each side of the car to a bracket $b$, Fig. 2, to support the framing $c$, at different heights from the road-bed.

Connected to the framing $c$, is a chain $f$. This chain is also attached to the framing $d$, and is arranged so as to enter an eye $g$, projecting from the dash-board $a^1$. The chain is also provided with a hook $g^1$, to enter a link of the chain so as to support the front portion of the fender in an extended position, as shown in Fig. 2.

As the apron is arranged, when clipped to the bumper $a^2$, it will be firmly held in an angular position to the longitudinal portion of the fender, until the clamp $d^2$, is released from the bumper. When released the fender will be readily infolded clear of the bumper and assume a position above and in rear of said bumper, as shown in Fig. 3, and the flexible rope beds of both members of the fender will be protected against undue wear.

Having thus described the nature and objects of our invention, what we claim as new and desire to secure by Letters Patent is:—

1. A car-fender, consisting of a longitudinal member and an apron member which is fulcrumed thereto, the longitudinal member being rearwardly extended and having upwardly curved terminals, said apron member having a clamping device attached to the upper portion thereof, said device being so arranged as to bear against and fit under the bumper of the car, substantially as and for the purposes described.

2. A car fender, consisting of a longitudinal member provided with a rope bed, an apron member provided with a rope bed, said apron member being fulcrumed to the longitudinal member and a clamping device attached to the upper portion of the apron member, said device being arranged so as to bear against and fit under the bumper of the car, substantially as and for the purposes described.

In witness whereof, we have hereunto set our signatures in the presence of two subscribing witnesses.

JAMES H. E. BRANSON.
WILLIAM H. QUICK.
THOMAS F. MACKELL.

Witnesses:
 THOMAS M. SMITH,
 J. WALTER DOUGLASS.

Copies of this patent may be obtained for five cents each, by addressing the "Commissioner of Patents, Washington, D. C."